W. McENERNEY.
ADJUSTABLE SPEED MECHANISM.
APPLICATION FILED APR. 28, 1913.
1,137,769.
Patented May 4, 1915.
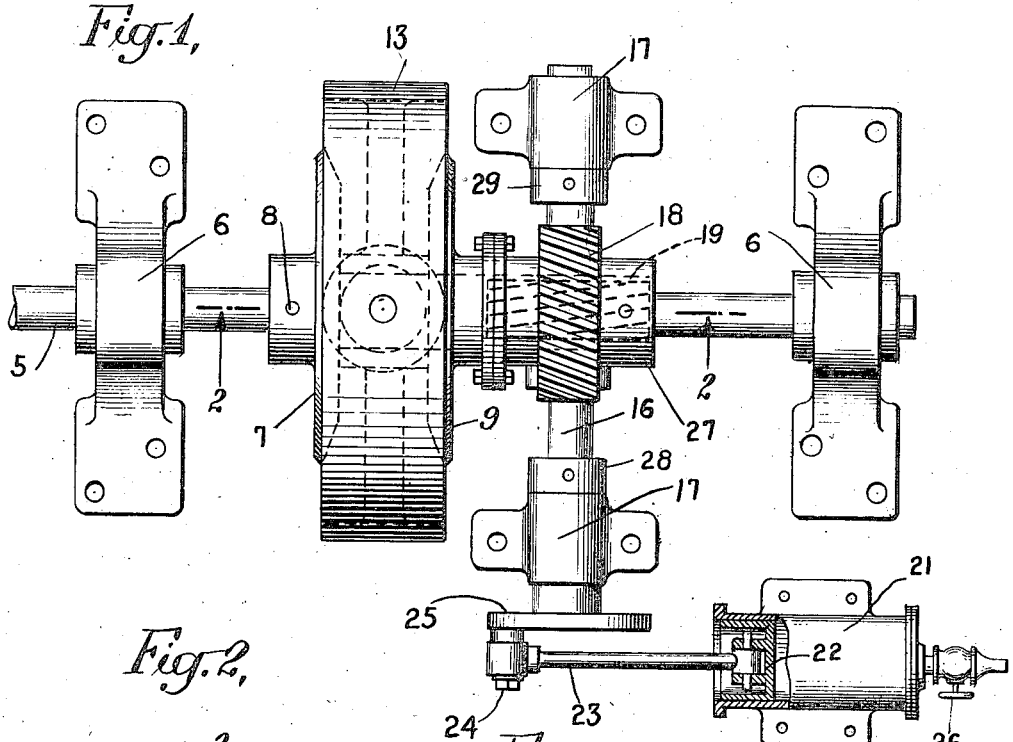
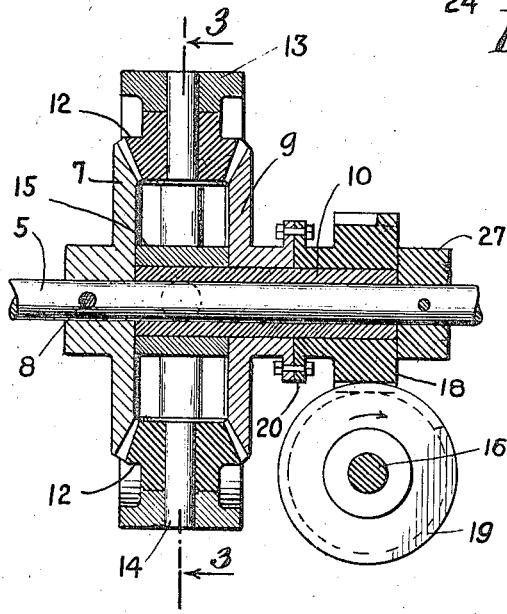
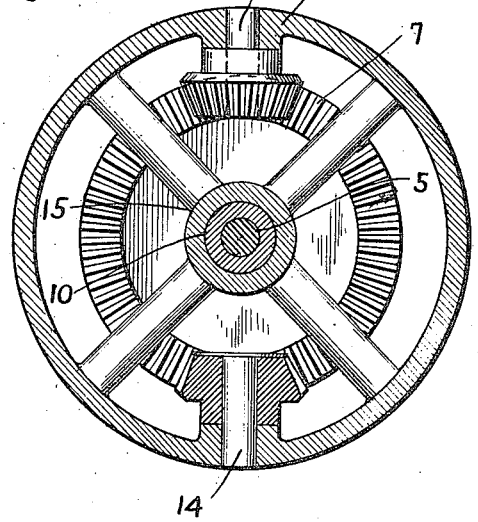
WITNESSES
INVENTOR
William McEnerney
BY
ATTORNEYS

UNITED STATES PATENT OFFICE.

WILLIAM McENERNEY, OF NEW YORK, N. Y.

ADJUSTABLE-SPEED MECHANISM.

1,137,769.  Specification of Letters Patent.  Patented May 4, 1915.

Application filed April 28, 1913. Serial No. 764,020.

*To all whom it may concern:*

Be it known that I, WILLIAM McENERNEY, a citizen of the United States, residing in the borough of Manhattan, city, county, and State of New York, and whose post-office address is No. 30 Church street, New York city, have invented certain new and useful Improvements in Adjustable-Speed Mechanism; and I do hereby declare the following to be a full, clear, and exact description of the invention, such as will enable others skilled in the art to which it appertains to make and use the same.

The object of my invention is to provide a simple, durable and compact form of gear mechanism adapted for use wherever variations in speed are to be effected between a motor or source of power and the machine which it drives.

In the carrying out of my invention I have utilized the principle of the differential gear and have secured the variations in speed by controlling the speed of one of the driven members of a set of differential gears, so that the said member, through its reactive effect upon the other driven member of the set will serve to govern the speed of such other driven member,—this last driven member being the one which transmits the power to the machine.

My invention accordingly resides in the combination with a driving gear and a power-transmitting member, of a so-called controlling gear, and an intermediate gear carried by the power-transmitting member, driven by the driving gear and reacting against the controlling gear, to thereby form a driving connection between the driving gear and power-transmitting member, together with means for governing the speed of rotation of the controlling gear, in the form of a governing shaft driven by the controlling gear through angular thrust gearing and a regulatable retarding device acting on the governing shaft. By varying the braking effect on the so-called governing shaft, the speed of this shaft is controlled, and this shaft being positively driven by the controlling gear serves to thereby determine the speed of the controlling gear, which gear by its reactive effect upon the intermediate gear serves to fix the speed of the power-transmitting member, by which said intermediate gear is carried.

The accompanying drawing illustrates the invention in a concrete and preferred embodiment, but I would have it understood that various changes and modifications may be made without departing from the true scope of the invention.

In the drawing: Figure 1 is a top plan view of a variable speed transmission gear set embodying the invention. Fig. 2 is a longitudinal sectional view of the same taken substantially on the plane of line 2—2 of Fig. 1, and Fig. 3 is a transverse sectional view taken substantially on the plane of line 3—3 of Fig. 2.

Referring now to the drawing in detail: the numeral 5 designates a power shaft on which the gears are supported and which in the present instance constitutes a drive shaft. This power shaft may be a motor shaft, line-shaft or the like, and is here shown journaled in suitable bearings 6.

7 designates the drive gear, which, for driving purposes is made fast upon the drive shaft by a pin 8. The controlling gear is indicated at 9 and this gear, in the present instance, is freely rotatable on the loose bearing sleeve 10 interposed between the controlling gear and the shaft 5.

12 designates the intermediate gear, or gears, two such gears being shown, and 13 indicates the so-called power-transmitting member which carries the intermediate gear and by which power may be imparted to the machinery, to be driven. This power-transmitting member is here shown in the form of a pulley, but it is evident that it could be a gear or other driving element. The intermediate gears are shown mounted on interior radially disposed stub shafts 14—if desired these stub shafts could be the spokes of the pulley 13 which here constitutes the power-transmitting member.

To make the gearing as compact as possible I preferably use bevel gears, as the driving and control gears and mount them on the shaft facing each other substantially as shown, with the intermediate gears, in the form of bevel pinions disposed therebetween. The power-transmitting member is mounted so that it may rotate independently of both the drive gear and the control gear and a convenient method of supporting it is to journal it on the loose sleeve 10 between the two bevel gears, it having for this purpose, as indicated in Figs. 2 and 3, a hub portion rotatably fitting the sleeve.

The operation of the parts thus far described is as follows: The drive gear 7, meshing with the intermediate gears 12, rotates the same and these intermediate gears by acting against the control gear as an abutment, impart movement to the power-transmitting member 13. If the control gear is held stationary it is evident that the intermediate gears will, by reacting against the control gear as a relatively stationary abutment, transmit the full speed of the drive shaft to the power-transmitting member. The intermediate gears in pushing back against the control gear as an abutment tend to rotate the control gear backward. By allowing the control gear to rotate backward it is obvious that the forward travel of the intermediate gears and of the power-transmitting member, which they propel, will be lessened to the extent of such backward travel. By controlling the speed of the reverse rotation of the control gear I am therefore enabled to secure any desired speed in the power-transmitting member.

I will now describe the means for governing the action of the control gear. 16 indicates a so-called speed-governing shaft journaled in brackets 17 and disposed at right angles to the drive shaft. This governing shaft is driven by the control gear so that by regulating its speed the speed of the control gear may be varied at will. The drive from the control gear is effected by a spiral gear 18 carried by the control gear, which meshes with a spiral gear 19 fast on the shaft. Gear 18 is in the illustration carried by the control gear by bolting its hub to the hub of the control gear. The purpose of this angular relation of the drive shaft and the governing shaft and the interposition of what may be termed angular thrust gearing, (that is, gears which have engaging tooth surfaces angularly arranged with respect to the gear axes so that rotation of the driven gear is due to a relatively small circumferentially directed component of the driving force, the other component of which is an axially directed thrust) is to reduce the force exerted on the control piston 22 by the reaction of intermediate gears 12 on the controlling gear 9, while at the same time keeping the speed of the control piston within practical limits. By this expedient it becomes possible to attain extreme compactness of the variable speed mechanism with a minimum number of gears and making use of simple, durable and well-tried machine elements. If the desired range of speed variation is extremely large so that the piston speed of the pump becomes excessive, it is only necessary to interpose speed-reducing gearing between shaft 16 and the pump crank.

The retardation of the speed-governing shaft may be accomplished by any suitable braking device, and in the preferred form is accomplished by means of a regulatable air pump driven by said shaft, the pump being shown as consisting of a cylinder 21, and a piston 22 in the cylinder, connected by a suitable rod 23 with a crank 24 carried by a crank disk 25 on the end of the shaft. A suitable control valve 26 connected with the cylinder serves to vary the load exerted by the pump and hence the retarding effect brought to bear upon the speed-governing shaft. By the simple operation of this valve the speed of shaft 16 is regulated and hence the speed of the control gear is governed, the control gear serving in the manner already described to determine the speed of the power-transmitting member. A thrust collar 27 may be mounted on the drive shaft for taking up the end thrust of the bevel gear 9 and the spiral gear 18. Thrust collars 28 and 29 may be provided on the shaft 16 to take care of any end play of that shaft.

The extreme simplicity and compactness of my invention make it readily adaptable to any kind of machinery where a variable speed is desired and render its use practicable even though the space available is quite limited. If desired the power-transmitting member may be used for driving purposes, the so-called drive gear being employed for the transmission of power. The control gear serves in such a case to govern the speed of the member which delivers the power in the same manner as before described.

What I claim is:

1. Adjustable speed transmission mechanism comprising a drive gear to which the power of the primary driving source is applied, a driven element from which power is taken at the adjusted speed, and a control gear; an intermediate gear carried by the driven element, meshing with the drive gear and reacting against the control gear to form a differential connection between the drive gear and the driven element, a speed governing shaft disposed at an angle to the axis of the control gear, angular thrust driving gearing through which the governing shaft is driven from the control gear, and a retarding device acting on the speed governing shaft and controllable to vary the speed of the said shaft and of the control gear which drives said shaft.

2. Adjustable speed transmission mechanism comprising a drive gear to which the power of the primary driving source is applied, a driven element from which the power is taken at the adjusted speed, and a control gear; an intermediate gear carried by the driven element, meshing with the drive gear and reacting against the control gear to form a differential connection between the drive gear and the driven element, a speed governing shaft disposed at an angle to the axis of the control gear, angular thrust driving gearing through which the governing shaft is driven from the control gear, a pump operated by the speed-governing shaft, and a valve controlling said pump to thereby control the speed of the speed-governing shaft and of the control gear which drives said shaft.

3. Adjustable speed transmission mechanism comprising a drive gear to which the power of the primary driving source is applied, a driven element from which the power is taken at the adjusted speed, and a control gear; an intermediate gear carried by the driven element, meshing with the driven gear and reacting against the control gear to form a differential connection between the drive gear and the driven element, a speed-governing shaft disposed at an angle to the axis of the control gear, high pitch spiral gearing through which the governing shaft is driven from the control gear, and a retarding device acting on the speed-governing shaft and controllable to vary the speed of the said shaft and of the control gear which drives said shaft.

In testimony whereof I affix my signature in presence of two witnesses.

WILLIAM McENERNEY.

Witnesses:
H. M. LEWIS,
M. A. BILL.